(12) United States Patent
Tai et al.

(10) Patent No.: US 6,185,084 B1
(45) Date of Patent: Feb. 6, 2001

(54) ELECTROSTATIC PARTICLE TRANSPORTATION

(75) Inventors: Yu-Chong Tai; Sang Wook Lee; Amish Desai, all of Pasadena, CA (US)

(73) Assignee: California Institute of Technology, Pasadena, CA (US)

(*) Notice: Under 35 U.S.C. 154(b), the term of this patent shall be extended for 0 days.

(21) Appl. No.: 09/167,407

(22) Filed: Oct. 6, 1998

Related U.S. Application Data

(60) Provisional application No. 60/061,311, filed on Oct. 6, 1997.

(51) Int. Cl.[7] ................................................. H01T 23/00
(52) U.S. Cl. ........................ 361/230; 361/225; 361/226
(58) Field of Search ................................. 361/230, 226, 361/225

(56) References Cited

U.S. PATENT DOCUMENTS

| | | | |
|---|---|---|---|
| 3,581,462 | 6/1971 | Stump | 55/2 |
| 4,354,861 | 10/1982 | Kalt | 55/130 |
| 5,582,632 | 12/1996 | Nohr et al. | 95/78 |
| 5,593,721 | 1/1997 | Daidai et al. | 427/100 |

Primary Examiner—Stephen W. Jackson
(74) Attorney, Agent, or Firm—Fish & Richardson P.C.

(57) ABSTRACT

Methods and apparatus implementing a technique for electrostatically transporting a particle through a medium. In general, one implementation includes a substrate; a first insulation layer formed on the substrate; a plurality of electrodes arranged in a sequence on the insulation layer, where the electrodes are divided into a plurality of groups and the electrodes are arranged by group; a second insulation layer over at least one of the electrodes; and a phase shift circuit connected to the electrodes which supplies a voltage wave-form to each group of electrodes, where each voltage wave-form for each group is phase-shifted relative to the other phase-shifted wave-forms.

41 Claims, 19 Drawing Sheets

$F_D(v)$: driving force from applied voltage
$F_I(\rho)$: Image force due charges on particle
$F_m$: Meniscus force
$F_{vdw}(d)$: Van der Waals force radial zig-zag linear $F_D(v)$: driving force from applied voltage
$F_I(\rho)$: Image force due charges on particle
$F_m$: Meniscus force
$F_{vdw}(d)$: Van der Waals force

ELECTROSTATIC PARTICLE TRANSPORTATION

This application claims the benefit of U.S. Provisional Application No. 60/061,311, filed Oct. 6, 1997.

The Government may have certain rights based on Grant No. N66001-96-C-8632 awarded by U.S. Navy.

TECHNICAL FIELD

The present disclosure relates to the electrostatic transportation of particles.

BACKGROUND

Transport of particles is fundamental to many instruments including airborne samplers, particle sorters, and electrostatic cleaning apparatuses. Specifically, the particle diameter range from 1 to 10 $\mu$m is of significant importance because many airborne pollutants such as biological spores, dust particles, and chemical agents fall into this geometric size range. In addition, other airborne pollutants, orders of magnitude smaller than this size range, have also been dispersed in air with the aid of larger carrier particles which are in the 1–10$\mu$m size scale. Therefore, such a particle transport device becomes a vital component of a wide range of instruments.

Electrostatic particle transportation for 1–10 $\mu$m sized particle has been an unresolved task for engineers. Devices for manipulation and transport have been developed for larger size ranges of particles, but not in the 1 to 10 $\mu$m particle scales. Surface forces and particle charging become difficult issues in successfully engineering a robust particle transport mechanism. For example, Novick, Hummer, and Dunn have noted that the sub-10 $\mu$m range presents a different regime where surface adhesive forces and particle charging hinder the successful engineering of a robust particle transport system. See V. J. Novick, C. R. Hummer, and P. F. Dunn, "Minimum dc electric field requirements for removing powder layers from a conductive surface," Journal of Applied Physics, Vol. 65, 3242–3247, 1989. Previous MEMS work only reported success on moving larger particles (over 30 $\mu$m) with voltages typically in the kV regime. See F. M. Moesner, T. Higuchi, "Devices for Particle Handling by an AC Electric Field," IEEE Conference Proc. MEMS 1995.

SUMMARY

The present disclosure describes methods and apparatus implementing a technique for electrostatically transporting a particle through a medium. In general, one implementation includes a substrate; a first insulation layer formed on the substrate; a plurality of electrodes arranged in a sequence on the insulation layer, where the electrodes are divided into a plurality of groups and the electrodes are arranged by group; a second insulation layer over at least one of the electrodes; and a phase shift circuit connected to the electrodes which supplies a voltage wave-form to each group of electrodes, where each voltage wave-form for each group is phase-shifted relative to the other phase-shifted wave-forms.

The technique also includes generating a plurality of phase-shifted voltage wave-forms, each said voltage wave-form phase-shifted relative to each of the other phase-shifted voltage wave-forms; applying each phase-shifted voltage wave-form to a corresponding one of a plurality of electrodes to cause a particle to transport across the electrodes according to the phase-shifting, where the electrodes are arranged in sequential groups, each group including an electrode from each set in a sequence according to the phase-shift corresponding to that electrode, and where the particle is transported at a height over the electrodes between approximately 10 and 100% of the diameter of the particle.

BRIEF DESCRIPTION OF THE DRAWINGS

FIGS. 12 and 13 show the variation of transportation efficiency vs. insulation height for 8 $\mu$m glass spheres for Teflon™.

DETAILED DESCRIPTION

The present disclosure describes methods and apparatus implementing a technique for electrostatic particle transportation. In a preferred implementation, a chip built using micromachining technology includes patterned and insulated electrodes in a grid or arrays. The electrodes are specifically designed to electrostatically transport particles from 1–10 $\mu$m in diameter. Using conventional techniques, electrostatically transporting particles in this size range is very difficult. The technique of the present disclosure shows that such transportation can be done with the right combination of insulation materials, insulation thicknesses, particle sizes, particle compositions, wave-forms, frequencies, and voltages. Particle transportation efficiencies as high as 90% have been routinely achieved for 5 and 8 micron glass beads. This technology has wide applications. For example, a membrane air-filter utilizing this particle transportation technique can be fabricated.

Figure 1:
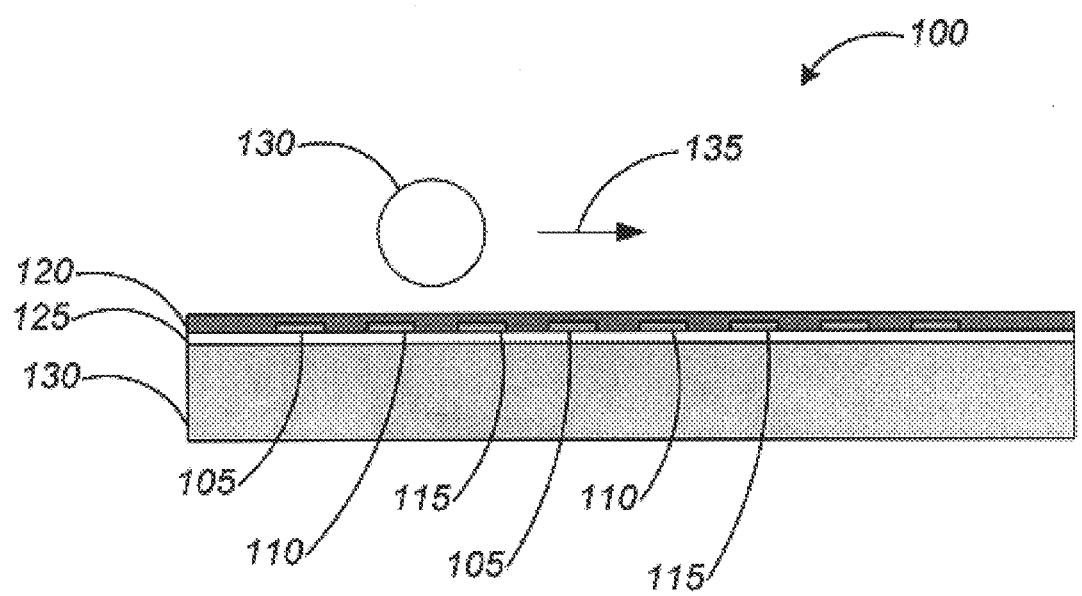
FIG. 1 shows an electrode panel of an electrostatic particle transportation ("EPT") system.

FIG. 1 shows an electrode panel 100 of an electrostatic particle transportation ("EPT") system including three electrode arrays 105, 110, 115 covered by an insulation layer 120. The electrodes 105, 110, 115 are positioned upon a silicon oxide ($SiO_2$) layer 125. The silicon oxide layer 125 is formed on a silicon substrate 130. The fabrication process is described below. A phase shifted electrical signal is applied to the electrode arrays 105, 110, 115 to cause a particle 130 to move in the direction indicated by arrow 135.

The components in the EPT system can vary depending upon the application and desired performance characteristics. The insulation layer 120 can be made from a variety of insulation materials, such as silicon nitride, photoresist, or polytetrafluoroethylene (i.e., Teflon™). The thickness of the insulation layer 120 can also vary from zero to approximately 12 μm. The size of the particle 130 which can be used with the system can vary from approximately 1 to 10 μm. In addition, the particle 130 can be made from various materials, including metal, glass, polystyrene, spores, etc. The signal supplied to the electrodes 105, 110, 115 can have a variety of wave-forms, frequencies, and voltages.

FIGS. 2A through 2E illustrate a preferred fabrication process for an electrode panel 200 of an EPT chip 200. The resulting EPT chip 200 includes two insulation layers and two conductive layers forming a three phase network. In alternative implementations having higher order phases, the electrode panel includes more insulation and conductive layers. A cross-sectional view of a finished electrode panel is shown in FIG. 1.

Figure 2A:
FIGS. 2A through 2E illustrate a preferred fabrication process for an electrode panel of an EPT chip.

In FIG. 2A, a silicon substrate 205 is coated with a layer 210 of thermal oxide approximately 1–2 μm thick. The substrate 205 can be made of alterative materials such as glass, quartz or sapphire, and the thermal oxide layer 210 can be formed from materials such as silicon dioxide.

Figure 2B:
Figure 2C:
Figure 2D:

In FIG. 2B, approximately 3000 Å of aluminum is thermally evaporated and patterned to form electrodes 215. In FIG. 2C, Silicon nitride ("SiN") is deposited by plasma enhanced chemical vapor deposition ("PECVD") to form an insulation layer 220 approximately 1 μm thick upon the electrodes 215 and thermal oxide layer 210. One or more via holes 225 are etched into the silicon nitride layer 220 to provide access to the electrodes 215. In FIG. 2D, a second Al layer 230 is deposited upon the silicon nitride layer 220 and patterned. In an alternative implementation, a similar process using gold instead of aluminum for the electrodes 215 and aluminum layer 230 and low temperature thermal oxide instead of PECVD silicon nitride for the silicon nitride layer 220 can be used.

Figure 2E:
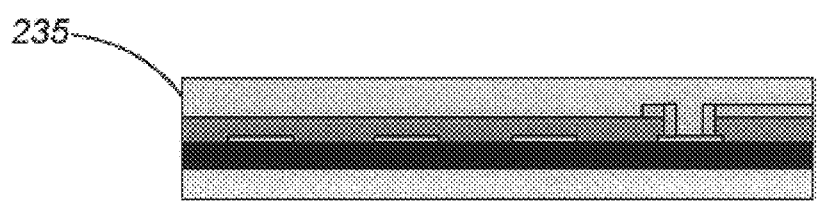

In FIG. 2E, an insulation layer 235 ranging from approximately 1 μm to 5 μm in thickness is deposited to cover the structure shown in FIG. 2D. The insulation layer 235 can be applied in varying thicknesses or omitted entirely to change particle adhesion characteristics. Various materials such as photoresist, parylene, and/or Teflon™ can be used for this insulation layer 235. The insulation layer 235 can also be modified through hexamethyldisilizane ("HMDS") surface treatment; $O_2$ plasma etching, which causes microroughening of the surface; or substrate annealing at 200–400° C. (for high temperature coatings such as silicon nitride), which reduce surface moisture.

Figure 3A:
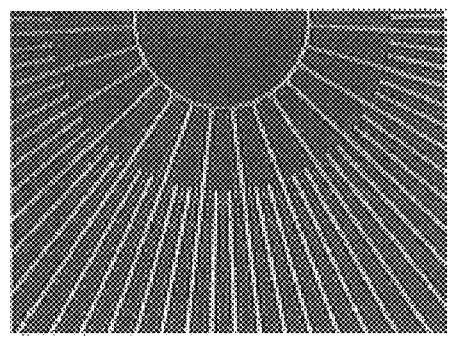
FIG. 3A shows an example of a radial electrode geometry.
Figure 3B:
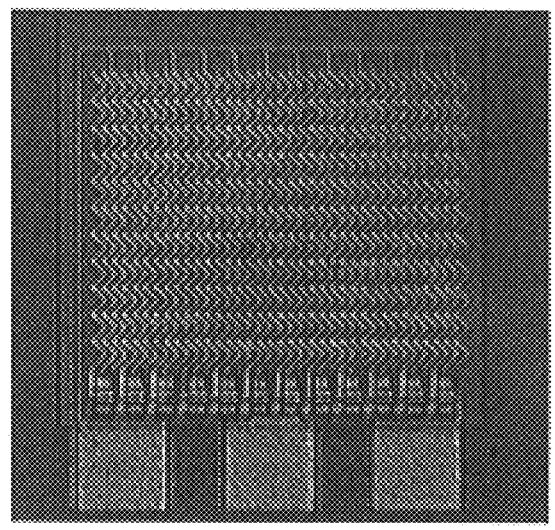
FIG. 3B shows an example of a zig-zag electrode geometry.
Figure 3C:
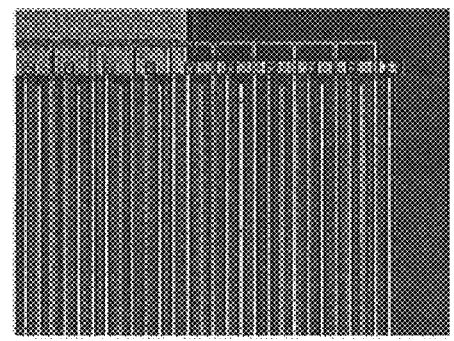
FIG. 3C shows an example of a linear electrode geometry.
Figure 4:
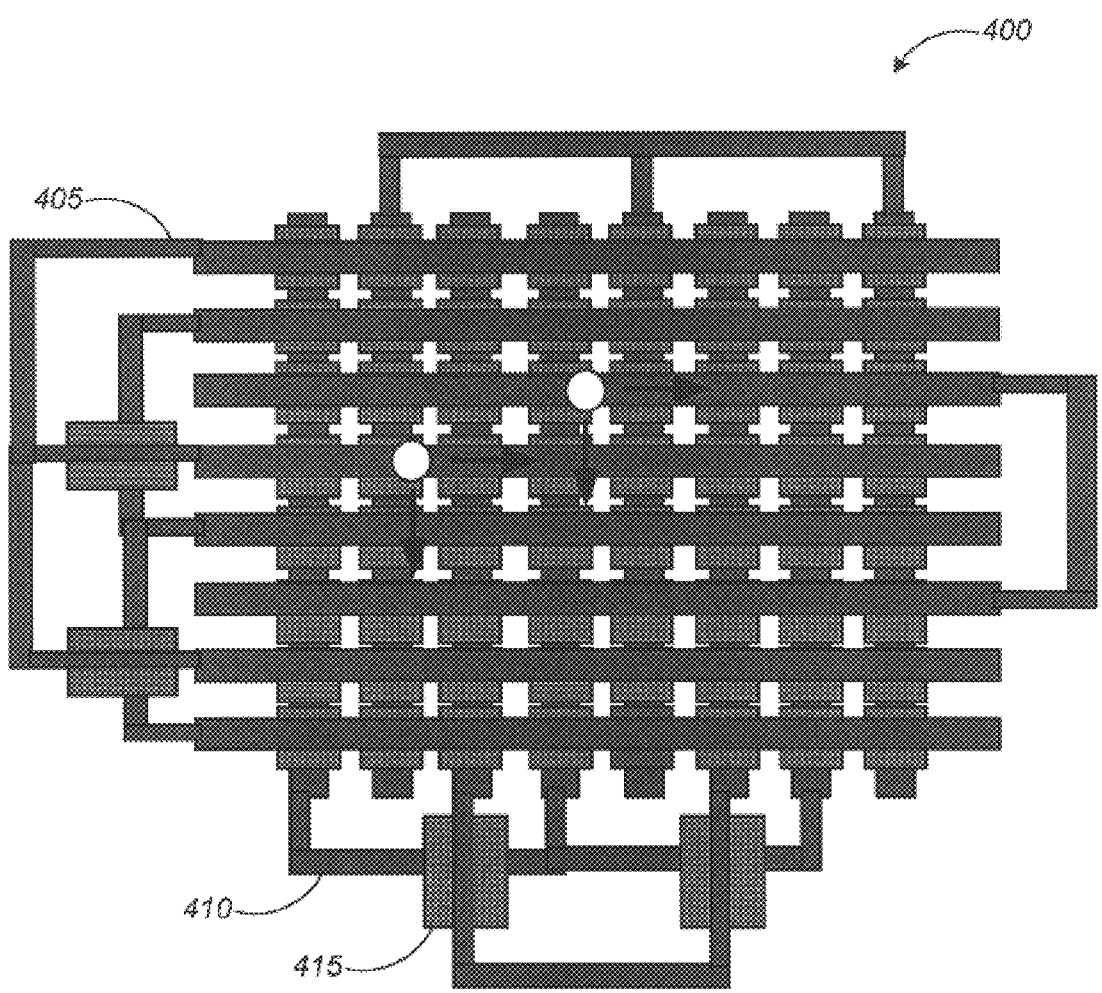
FIG. 4 shows an example of a linear two-dimensional grid of electrodes for two dimensional particle movement.

Various electrode geometries can be fabricated using the above process. Different designs can be used to transport particles in various areas on the chip. FIGS. 3A–3C show examples of different types of electrode geometries: radial (FIG. 3A), zig-zag (FIG. 3B), and linear (FIG. 3C). FIG. 4 shows an example of a linear two-dimensional grid 400 of electrodes for two dimensional particle movement. The grid 400 is formed from two linear arrays 405, 410 (recall the linear array in FIG. 3C). Insulators 415 are positioned between the linear arrays 405, 410 where the arrays 405, 410 overlap.

Figure 5:
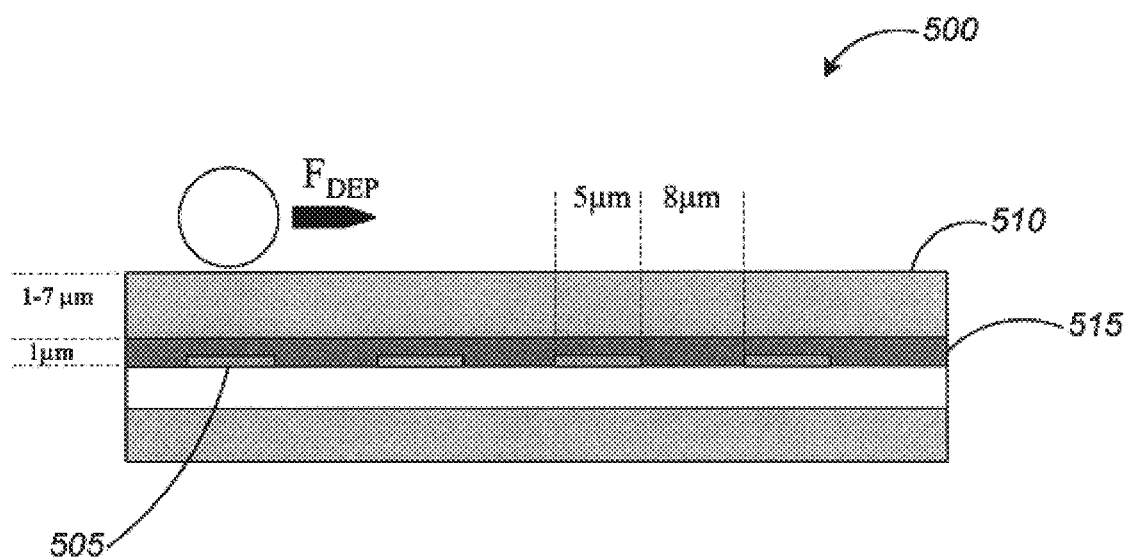
FIG. 5 shows a cross-section of an electrode panel with values for width or thickness.

The width of the individual electrodes and the spacing between electrodes are instrumental for optimal particle control. FIG. 5 shows a cross-section of an electrode panel 500 with values for width or thickness. The width of the electrodes 505 is preferably less than approximately 5 μm and preferably more than approximately 3 μm. The spacing between electrodes 505 is preferably based on the diameter of the particles. Hence, for particles around 8 μm, the electrode spacing is approximately 8 μm, and for particles with a diameter of approximately 5 μm, the electrode spacing is approximately 5 μm. These values are optimized for linear and zig-zag transportation structures. The insulation layer 510 is preferably approximately 1 μm to 7 μm thick, or more preferably 1 μm to 3 μm, to ensure minimal adhesion. The silicon nitride layer 515 is preferably approximately 1 μm thick.

Figure 6:
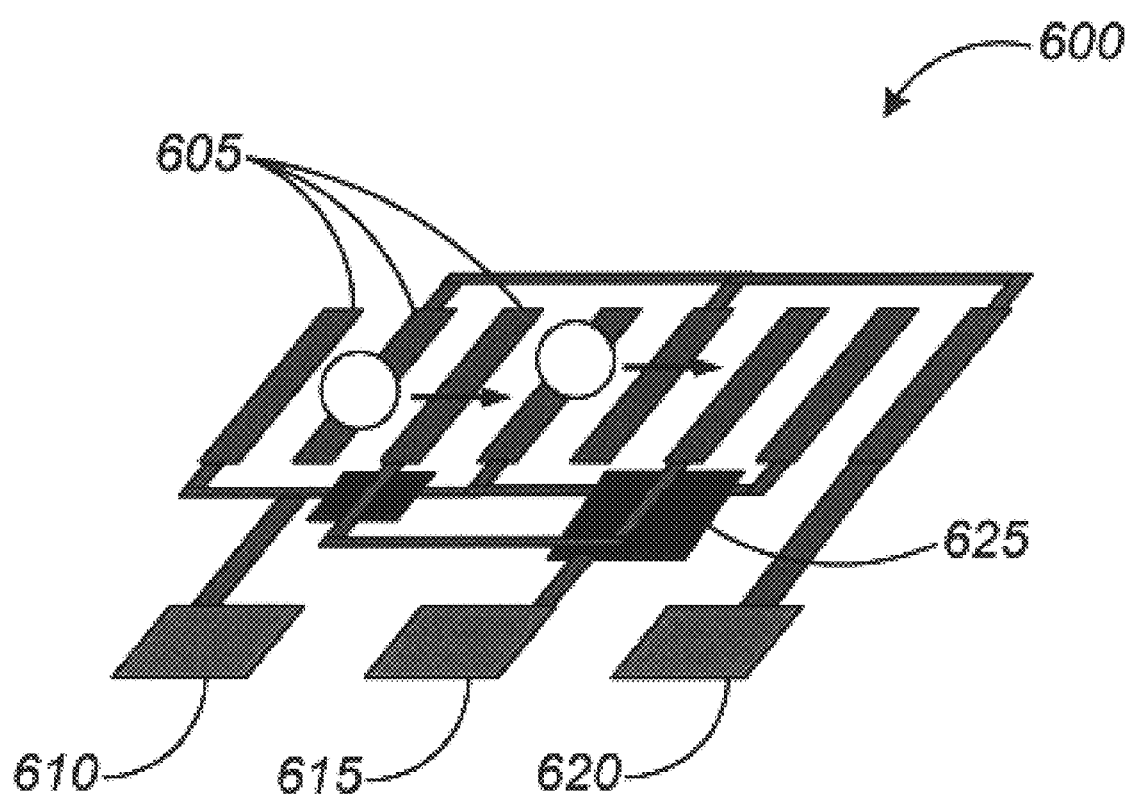
FIG. 6 shows a set of electrodes connected in three separate groups.

As noted above, the electrodes of the electrode panel operate in three phases. FIG. 6 shows a set 600 of electrodes 605 connected in three separate groups 610, 615, 620. Insulators 625 are positioned between electrodes or connections where groups overlap. Every third electrode 600 is interconnected so that a "traveling" voltage pattern through the three groups 610, 615, 620 can be utilized to transport particles in the direction of the phase progression.

Figure 7:
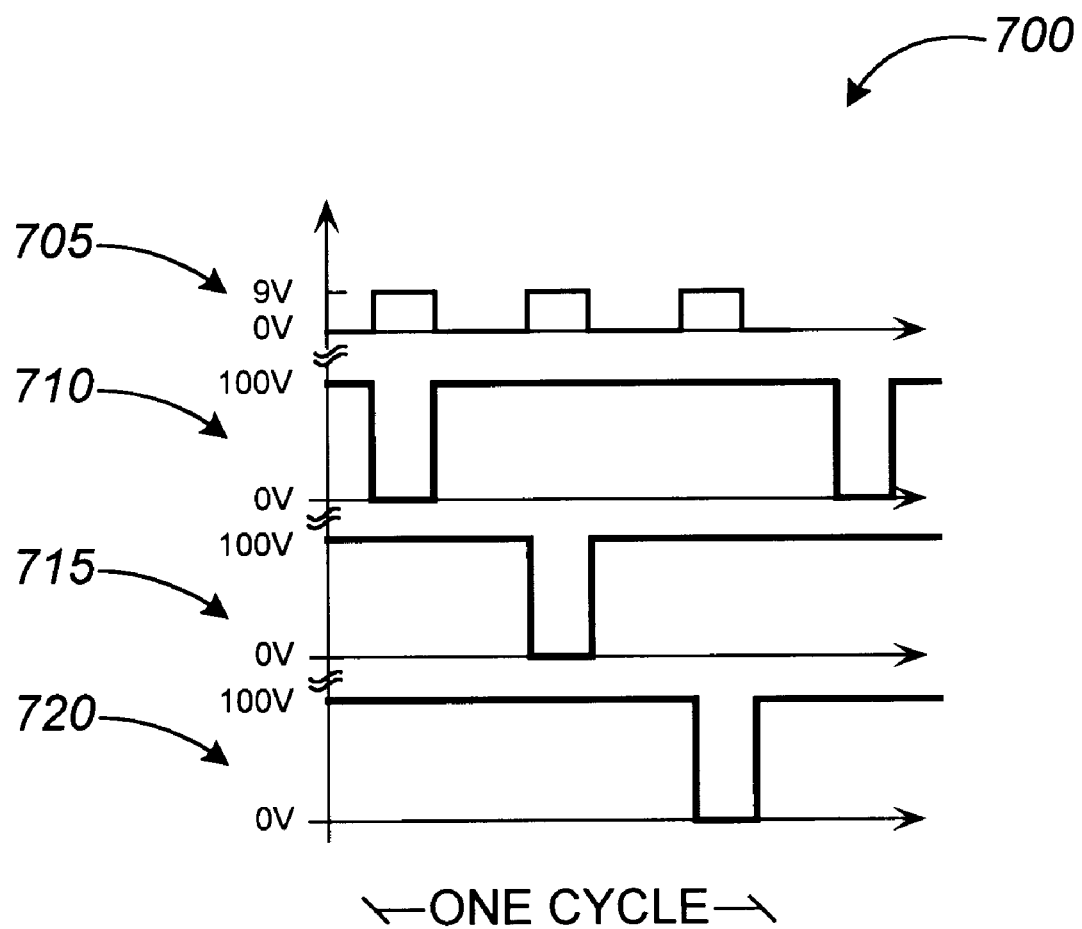
FIG. 7 shows voltage patterns for three-phase operation of the electrode panel.

FIG. 7 shows voltage patterns for the three-phase operation of the electrode panel. An original signal 700 is phase-shifted to form three waveforms, 705, 710, 715. Other voltage patterns such as sinusoidal waves, triangular waves, bi-polar traveling waves, or the inverse of the waveforms shown in FIG. 7 can also be utilized for sustained particle motion.

Figure 8:
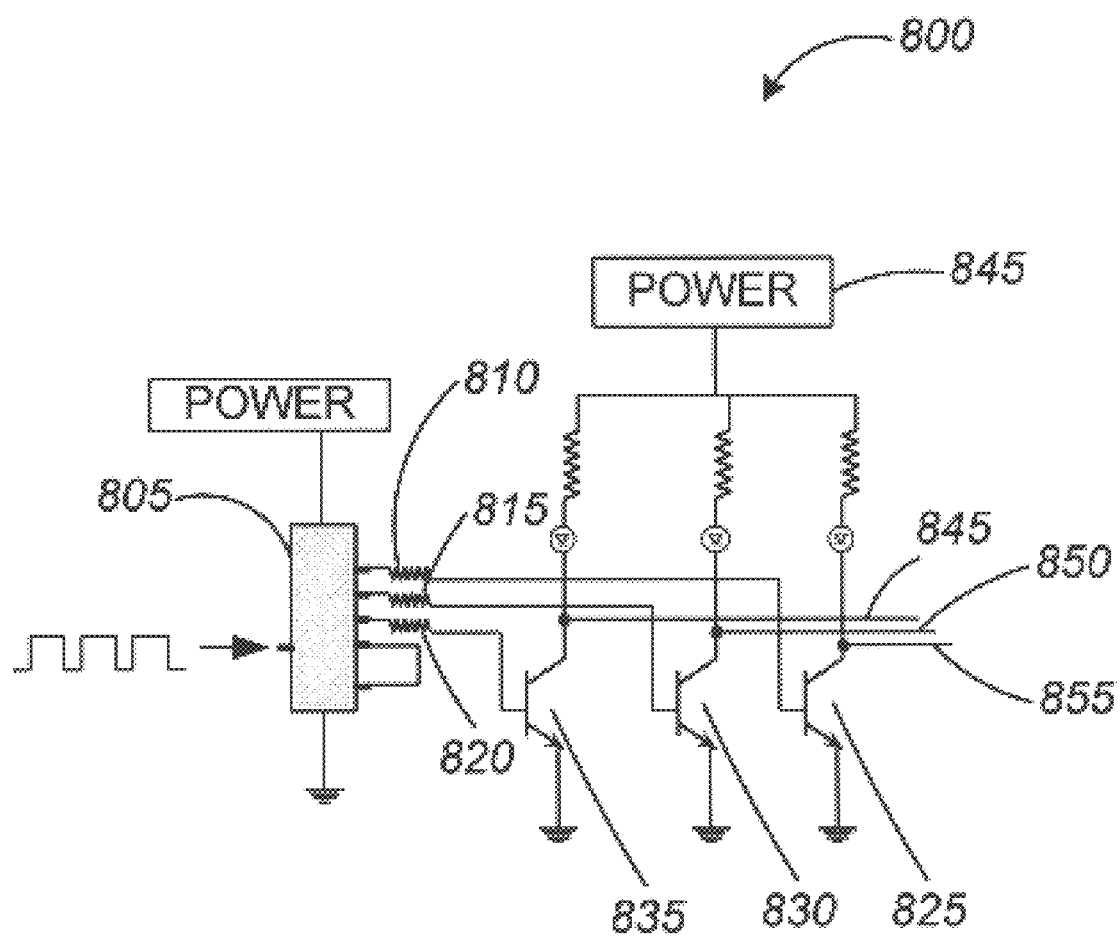
FIG. 8 shows a schematic of a phase circuit for generating the waveforms shown in FIG. 7.

FIG. 8 shows a schematic of a phase circuit 800 for generating the waveforms shown in FIG. 7. The phase circuit 700 delivers voltages preferably ranging from approximately 10V to 200V and at frequencies from approximately 0.1 Hz to 10 kHz. An input signal of approximately 0 to 9V is output sequentially by phase-shift circuit 805 on three separate lines 810, 815, 820. The signals on lines 810, 815, 820 drive corresponding transistors 825, 830, 835 to output a voltage signal from a power supply 840 to output lines 845, 850, 855. Hence, the signal on each output line 845, 850, 855 is sequentially phase shifted relative to one another such that output line 845 has the signal 710 shown in FIG. 7, output line 850 has the signal 715, and output line 855 has the signal 720. Each of the output lines 845, 850, 855 is connected to a group of electrodes in the electrode panel (recall FIG. 6) to drive the electrodes in phase operation. Particles move across the electrodes in according to the phase shifted waveform, as described below.

In alternative implementations, particles can be made to change direction by switching phases 1 and 3, and hop (in one place) from one electrode to another by turning off one of the phases. Such implementations include a double pole double throw type of switch on the output lines.

Figure 9:
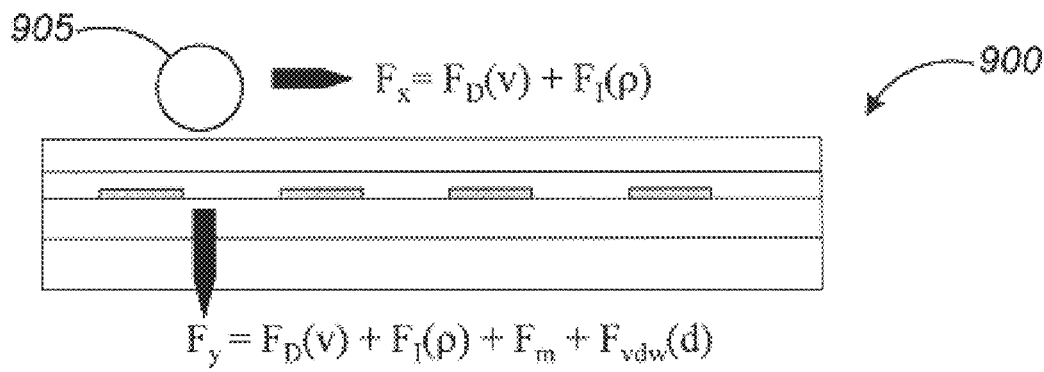
FIG. 9 depicts forces acting upon a particle.

Understanding stiction forces on the particle helps in analysis of the EPT system. It is well known that for particles in the size range of 1–10 μm, adhesive forces arise from Van der Waals attraction, a meniscus force, and an image force resulting from charges on the particle. Gravitational and body forces are negligible for these airborne particles. The horizontal or x-component of the electrostatic forces (dielectric and image) due to the voltage wave-form are responsible for particle transport. However, the y-component acts downward thus adding to the stiction forces. FIG. 9 depicts an electrode panel 900 and the $F_x$ and $F_y$ forces on a particle 905. These forces are described below.

$$F_x = F_{D,x}(v) + F_{I,x}(p)$$

$$F_y = F_{D,y}(v) + F_{I,y}(p) + F_m + F_{vdw}(d)$$

where $F_{D,x}(v)$ and $F_{D,y}(v)$ are the x and y components of a driving force from applied voltage through the electrodes; $F_{I,x}(p)$ and $F_{I,y}(p)$ are the x and y components of an image force due to charges on the particle; $F_m$ is a meniscus force; and $F_{vdw}(d)$ is a Van dew Waals force.

Figure 10:
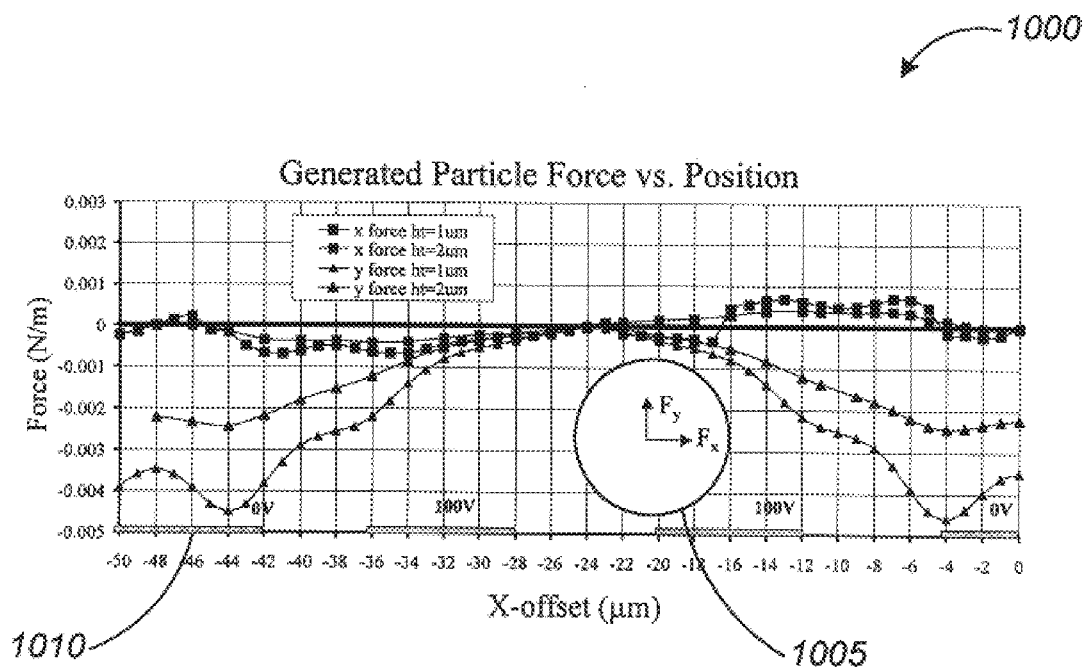
FIG. 10 is a chart of two dimensional finite element simulation results which clearly show this trend.

FIG. 10 is a chart 100 of 2-d finite element simulation results. The simulation parameters are as follows: a 8 μm $SiO_2$ particle 1005, 8 μm electrode 1010 width and pitch, 100V, heights of the particle of 1 and 2 microns, and the particle is uncharged. The electrodes 1010 and the particle 1005 are drawn to scale on the x-axis. The x coordinate of each data point represents the position of the center of the particle 1005 with respect to the electrodes 1010. The y-axis shows magnitude of force in Newtons per meter.

Figure 11:
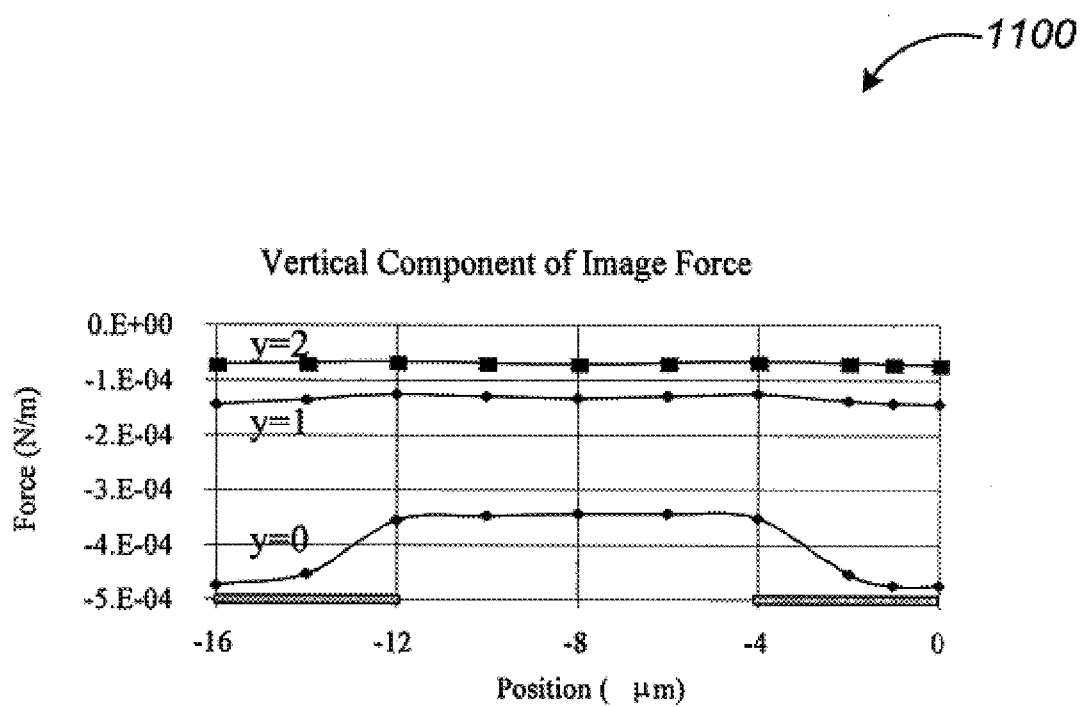
FIG. 11 is a chart which shows the magnitude of the image forces as a function of position.

FIG. 11 is a chart 1100 which shows the magnitude of the image forces as a function of position. In this simulation, the parameters are the same as in the simulation for FIG. 10 except that the applied voltage is 0V, and the particle is given a charge density. The results show that only a downward component exists, the maximum is on top of the electrode, and this force diminishes as $1/r^2$ (where r is the distance to the center of the particle). Superposition of these forces gives a total driving force.

These simulation results corroborate the phenomena observed in experiments. In experiments, variation of the vertical distance which is controlled by the thickness of the insulation film, clearly affects the performance. If the insulation is too thin, the image forces dominate and efficiency drops. If the insulation film is too thick the driving force is not enough to overcome the adhesive forces. Therefore a certain ratio between the x and y forces on the particle must be reached in order to maximize transportation efficiency. This ratio is controlled with insulation thickness. However, each insulation film has its own optimal thickness because Van der Waals and meniscus-type interactions between the particle and the insulation surface differ depending upon the type of film.

Descriptions of experimental results with implementations of the technique of the present disclosure are described below to illustrate examples of application of the technique.

In one set of experiments, a variety of sizes and materials was tested with an implementation of the EPT system operating in air. Most of the experiments were performed on various linear electrode arrays with spacings of 5 μm and 8 μm, where the pitch and width spacing were identical. The following chart summarizes the types of particles tested.

| Microspheres | Mean diameter (μm) |
| --- | --- |
| Borosilicate glass | 5, 8, 11, 15.4 |
| Polystyrene DVB | 5, 8.7 |
| Paper Mulberry Pollen* | 11.1–15.6 |
| Bermuda Grass Smut Spores* | 5.8–8.2 |

*refers to hydrated size

Particle efficiency data was gathered by noting the ratio of particles transported to the edge of the linear electrode array vs. the total number of particles on the structure. Two major trends were noted during testing.

The transportation efficiency increases with increasing voltage apparently for each of the types of the final insulation films and for varying thicknesses of the insulation film. Secondly, the type of final surface coating appeared to have a significant effect on particle efficiency and threshold voltage, i.e., the minimum voltage level to exhibit particle motion. For example, photoresist film (hardbaked AZ 4400) resulted in apparent maximum efficiencies for glass particles of approximately 45%, while Teflon™ films resulted in efficiencies of approximately 80%. The table below summarizes the characteristics of different surface coatings.

| Linear 8 μm spacing structure, 8 μm glass particles | | | |
| --- | --- | --- | --- |
| Surface coating | Frequency range (Hz) | Max Efficiency | Threshold voltage (V) |
| PECVD silicon nitride | 0.9–10 | 10% | 80 |
| AZ 4400 | 0.1–100 | 45% | 50 |
| Teflon ™ (AF 1601S) | 1–500 | 80% | 40 |

Note: data has +/− 30% variation

Figure 12:
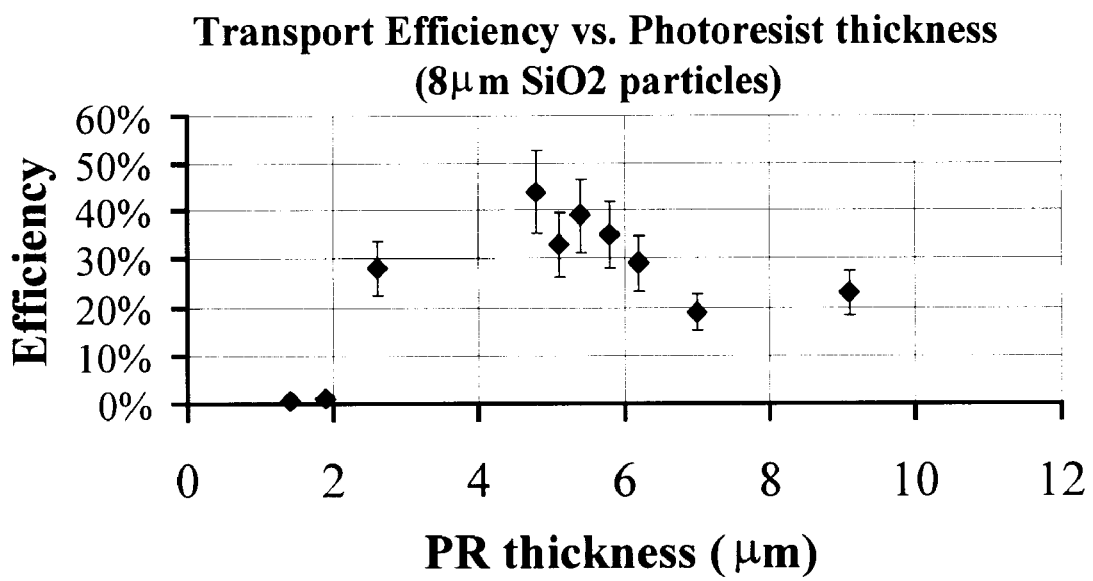
FIG. 12 shows the variation of transportation efficiency vs. insulation height for 8 $\mu$m glass spheres for photoresist.
Figure 13:
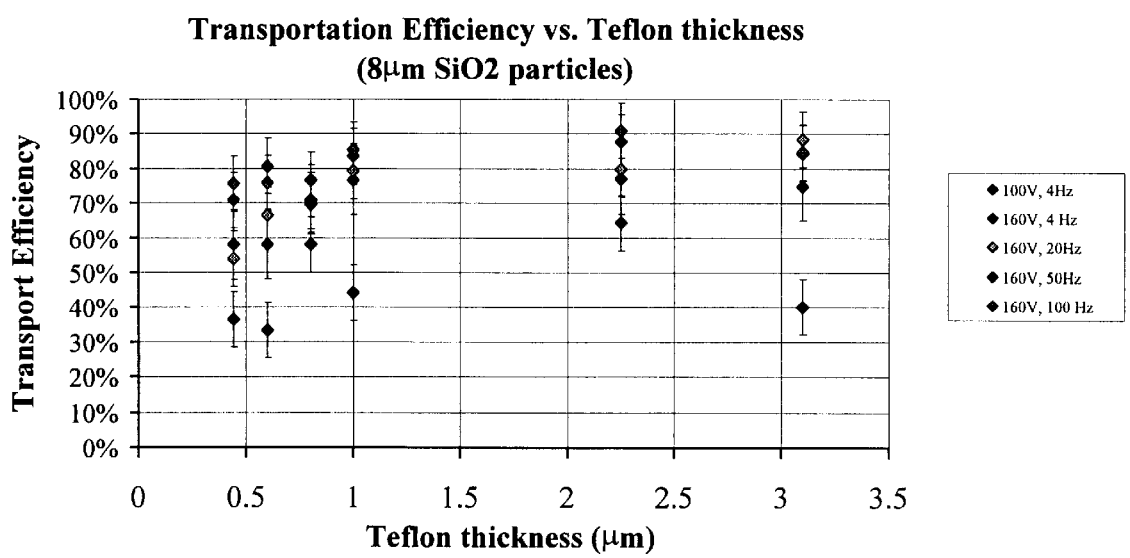

In addition to variation with different coating materials, transport efficiency also is a function of final insulation film thickness. There is an optimal thickness associated with the resist for maximum efficiency. FIGS. 12 and 13 show the variation of transportation efficiency vs. insulation height for 8 μm glass spheres for photoresist and Teflon™, respectively. As the insulation thickness increases, the efficiency decreases because the electrostatic force decreases away from the electrodes. However, if the insulation thickness is too thin, then the downward electrostatic force becomes much greater and consequently adds to the adhesive forces. As described above, finite element simulation verified this analysis. In addition, FIG. 13 also shows the effect of frequency and voltage. As frequency increases the efficiency improves, and then stays relatively constant.

Figure 14:
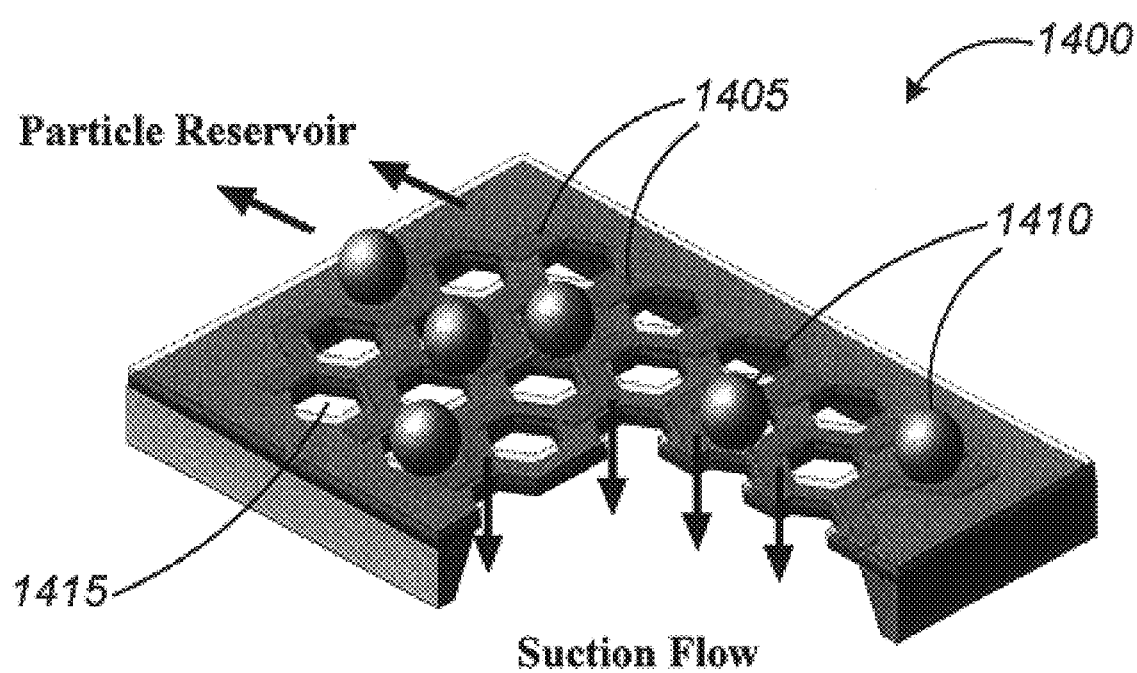
FIG. 14 shows a three dimensional view of a filter with electrodes.
Figure 15A:
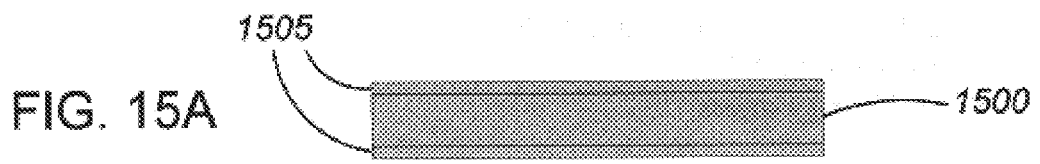
FIGS. 15A–15G show a fabrication sequence for the air filter shown in FIG. 14.
Figure 15B:
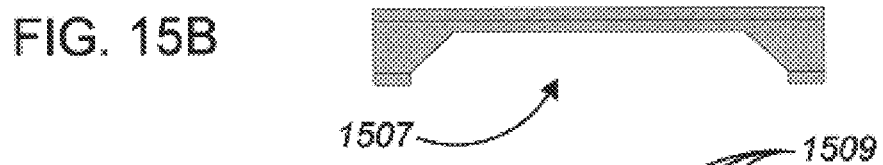
Figure 15C:
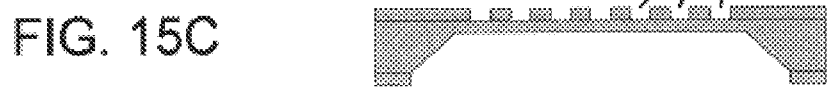
Figure 15D:
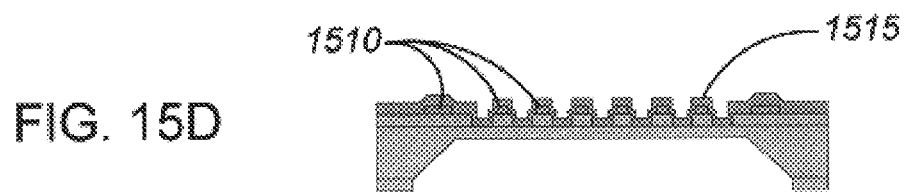
Figure 15E:
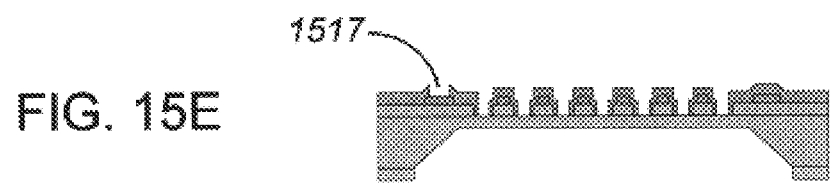
Figure 15F:
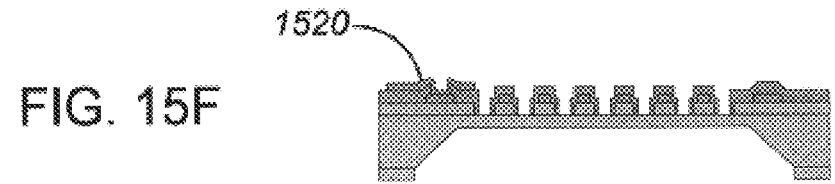
Figure 15G:
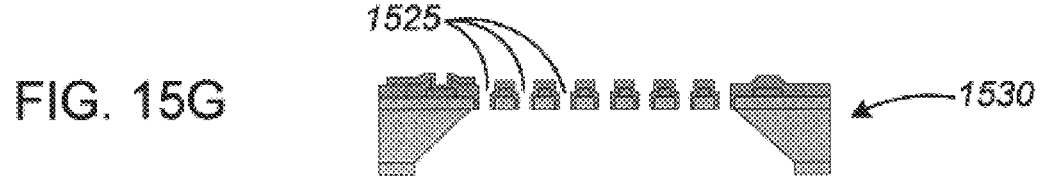
Figure 16A:
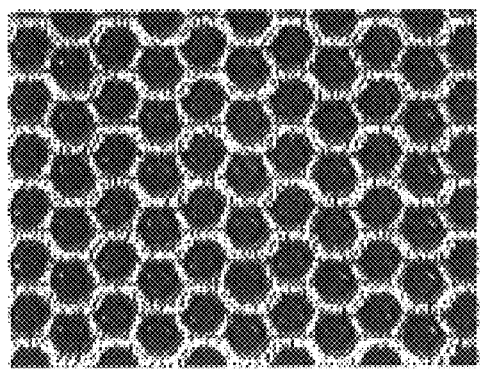
FIGS. 16A–16C show examples of three types of electrode designs.
Figure 16B:
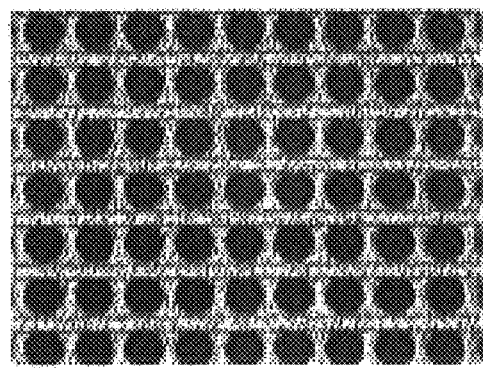
Figure 16C:
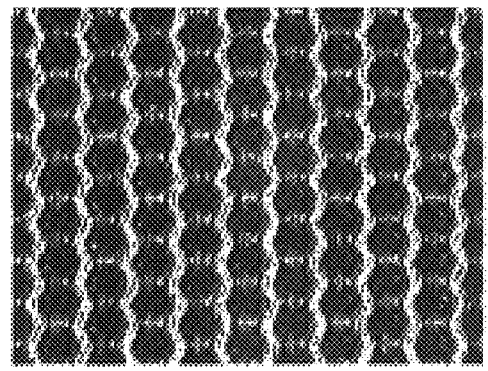

In another set of experiments, a micromachined airborne particle filter was constructed including an EPT system according to the present disclosure. FIG. 14 shows a three dimensional view of such a filter 1400 with electrodes 1405. Particles are collected from air by a suction fan mounted under the chip. The filter 1400 collects particles 1410 whose sizes are larger than the size of filter holes 1415 in the filter 1405. After being collected, the particles 1405 are electrostatically transported by traveling voltage wave-forms, as described above, to a particle reservoir (not shown). In the particle reservoir, the particles 1410 can be further processes, such as applying wetting and dissolving bio-agents.

FIGS. 15A–15G show a fabrication sequence for the air filter shown in FIG. 14. In FIG. 15A, approximately 1 μm of silicon nitride 1505 is deposited by low pressure chemical vapor deposition ("LPCVD") on a silicon wafer 1500. The silicon nitride layer 1505 forms a structural material for the filter 1400 and a mask for etching the backside wafer in potassium hydroxide ("KOH"). In FIG. 15B, one side 1507 of wafer 1500 is time etched until the thickness of the silicon wafer 1500 is approximately 20 $\mu$m. In FIG. 15C, the silicon nitride layer 1505 on the opposite side 1509 is patterned to prepare holes for the filter (recall the holes 1415 in the filter 1400 in FIG. 14). In FIG. 15D, approximately 2500 Å of aluminum is thermally evaporated and patterned to form electrodes 1510. Parylene is deposited to form an insulation layer 1515 over the electrodes 1510. As describer above, the insulation layer can also be formed from materials such as photoresist, Teflon™, or a combination. In FIG. 15E, the insulation layer 1515 is patterned to expose the silicon substrate 1500 between electrodes 1510 and open a contact hole 1517. The insulation layer 1515 also strengthens the eventual silicon nitride filter mechanically. In FIG. 15F, a second Al layer 1520 is deposited and patterned over the contact hole 1517. In FIG. 15G, the side 1507 of the silicon substrate 1500 is etched away in the central portion with bromine trifluoride to remove the silicon between the electrodes 1510 and open holes 1525 through the resulting filter 1530. FIGS. 16A–16C show examples of three types of electrode designs.

Particle transport in the resulting filter 1530 is performed using the same three phase circuit described above with reference to FIG. 8. An additional Teflon™ coating applied over insulation layer 1515 can improve the movement of 5 or 8 $\mu$m borosilicate glass particles.

In addition to particle transport in air, an alternative implementation provides particle transport in liquid using traveling wave-forms of higher frequencies. In another set of experiments, transport of Borosilicate glass particles has been done in vacuum pump oil and water. The glass particles move well in both liquids. The transportation of glass particles in oil is very similar with that in air. The yield of transportation is almost 100 %. In oil, glass particles are moved by the positive dielectrophoretic force, i.e., the particles move to the strongest electric field region. In water, the glass particles are moved by the negative dielectrophoretic force, i.e., the particles move to the weakest electric field region. The particles are levitated between the electrodes. The electrode geometry may vary from that described above for air depending upon the type of the liquid, such as varying the spacing between electrodes. However, the frequency ranges for particles in oil and water are quite different. Preferred operation frequencies are shown in the table below.

| Medium | Frequency Range | Threshold voltage |
|---|---|---|
| water | 100 kHz–4 MHz | 30 V |
| oil | 3 Hz–500 Hz | 20 V |

Figure 17:
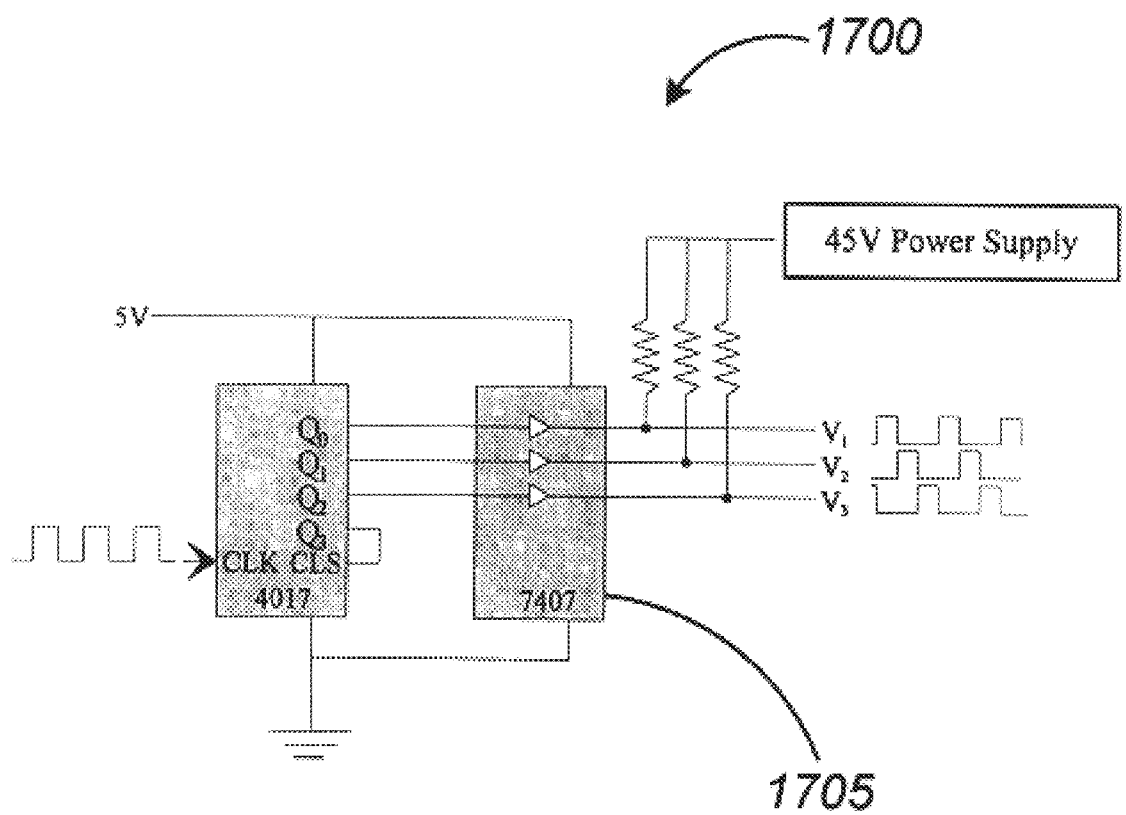
FIG. 17 shows an example of a high frequency phase circuit.

A high frequency and voltage circuit is used to transport particles in water. A high frequency power supply is necessary to avoid the electrolysis of water. An example of such a circuit 1700 is shown in FIG. 17. The high frequency phase circuit 1700 is similar to the phase circuit 800 shown in FIG. 8. However frequency circuit 1705 is used in place of the resistors 810, 815, 820 and transistors 825, 830, 835 to phase shift the input signal and increase the frequency to the appropriate level.

Figure 18:
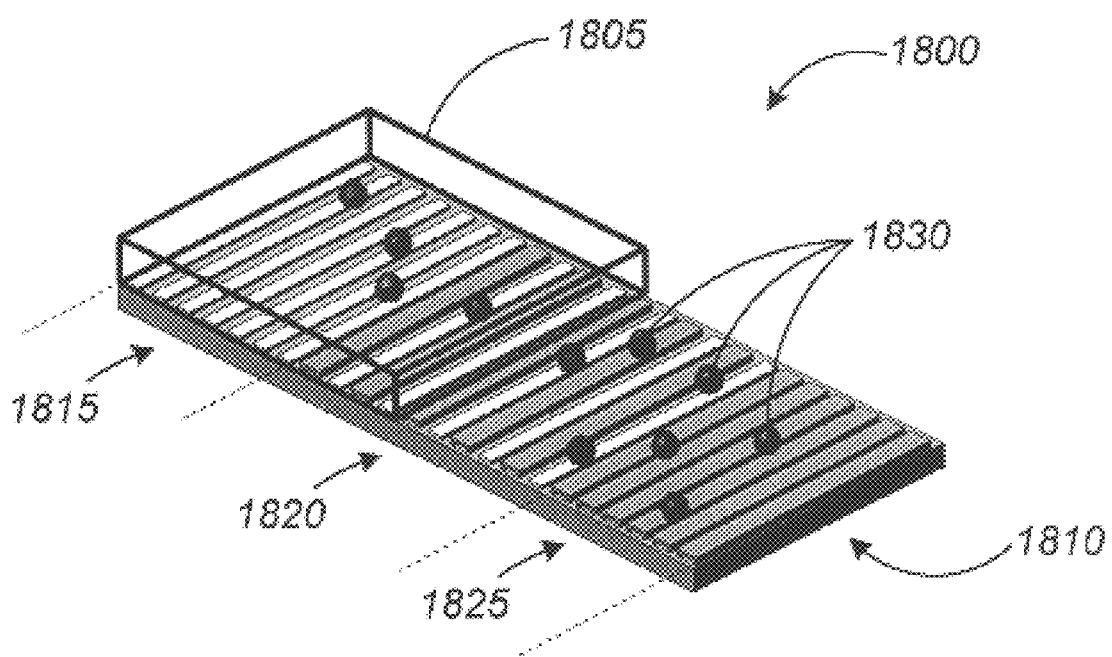
FIG. 18 shows a conceptual picture of liquid to air EPT system.

In another implementation, combining the implementations described above for air and liquid mediums, an EPT system provides particle transport from an air to liquid medium. FIG. 18 shows a conceptual picture of liquid to air EPT system 1800. A liquid channel or reservoir 1805 is created by etching a cavity in a glass slide. The etched slide is bonded to an electrode panel 1810. Alternative ways of creating this liquid interface include using a bulk micromachined, a surface micromachined silicon substrate, or molded silicone such as polydimethylsiloxane ("PDMS") instead of glass. As noted above, the electrode geometry and input voltage wave-form requirements can be different for transportation in air and in a liquid medium. Accordingly the electrode panel 1810 includes three regions of electrodes: a liquid region 1815, an interface region 1820, and an air region 1825. Each region has a different configuration of electrodes. Thus, particles 1830 are moved from one region to the next by the EPT process corresponding to the electrode configuration of the region. The liquid region 1815 is covered by the reservoir 1805 and includes electrodes configured as described above for a liquid EPT system. Similarly, the air region 1825 is exposed to air and includes electrodes configured as described above for an air EPT system.

Figure 19:
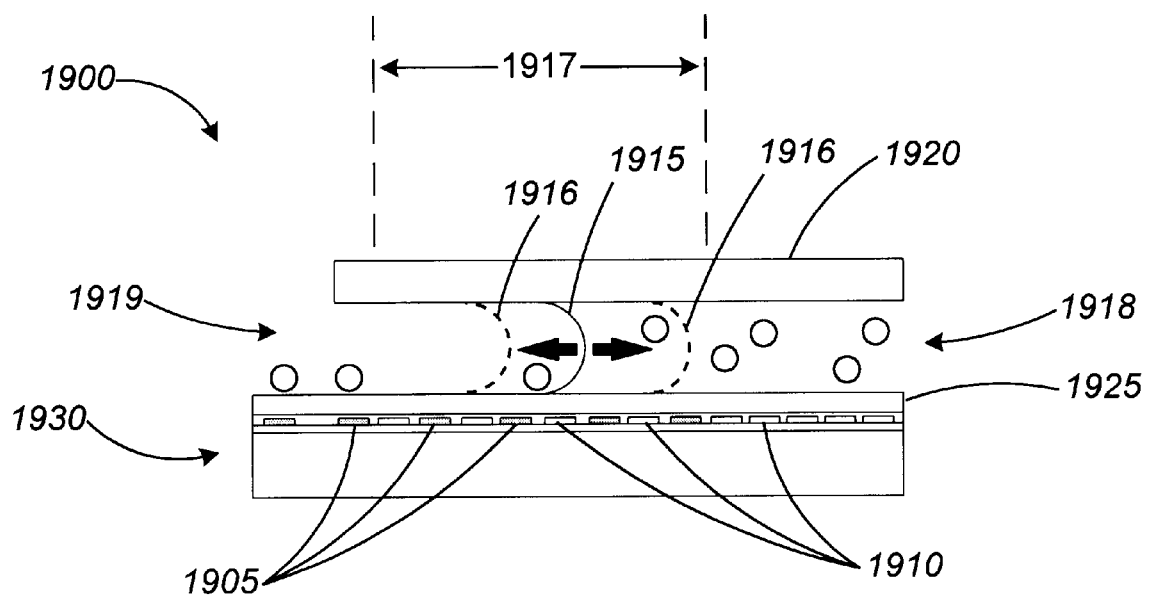
FIG. 19 shows a cross-section of an interface region and interdigitated electrodes.

In the interface region 1820, the electrodes for each medium are interdigitated with each other. FIG. 19 shows a cross-section of the interface region 1900 and the interdigitated electrodes 1905, 1910. A liquid meniscus 1915 is formed by the liquid contacting the reservoir 1920 and the insulation layer 1925 of the electrode panel 1930. The position of the liquid meniscus 1915 is not constant, but varies over a range 1917. Part of this variation of the meniscus 1915 is represented by dashed lines 1916. On the liquid side 1918 of that range 1917, the "liquid" electrodes 1910 are configured for liquid EPT. On the air side 1919 of the range 1917 of meniscus movement, the "air" electrodes 1905 are configured for air EPT. In the range 1917, the electrodes 1905, 1910 are interdigitated because the medium adjacent the electrodes 1905, 1910 varies between air and water depending upon the position of the meniscus 1915. The degree of interdigitation is not limited to a one-to-one ratio as shown in the picture, but can be varied to optimize performance (e.g., to every third or every fifth electrode can be for "liquid").

Numerous exemplary implementations of the technique have been described. However, the technique is not limited to the examples described above. For example, the technique may be applied to alternative media, such as gases other than air or other liquids, with appropriate modification to the electrode panel. Accordingly, the technique is limited only by the scope of the following claims.

What is claimed is:

1. A method of electrostatically transporting a particle through a medium, comprising:

generating a plurality of phase-shifted voltage waveforms, each said voltage wave-form phase-shifted relative to each of the other phase-shifted voltage wave-forms;

applying each phase-shifted voltage wave-form to a corresponding one of a plurality of electrodes to cause a particle to transport across the electrodes according to the phase-shifting, where the electrodes are arranged in sequential groups, each group including an electrode from each set in a sequence according to the phase-shift corresponding to that electrode, and where the particle is transported at a height over the electrodes between approximately 10 and 100% of the diameter of the particle.

2. The method of claim 1, wherein the phase-shifted voltage wave-forms have an amplitude and frequency set according to the media through which the particle is being transported.

3. The method of claim 1, wherein the medium is air.

4. The method of claim 1, further comprising:
generating a second plurality of phase-shifted voltage wave-forms which are different from said plurality of phase-shifted voltage wave-forms; and
applying each of the second plurality of phase-shifted voltage wave-forms to a corresponding one of a second plurality of electrodes to cause the particle to transport across the second plurality of electrodes according to the second phase-shifting.

5. The method of claim 4, where said plurality of electrodes and said second plurality of electrodes are arranged perpendicular to one another.

6. The method of claim 4, where at least a portion of the electrodes of said plurality of electrodes and a portion of the electrodes of said second plurality of electrodes are interdigitated.

7. The method of claim 4, where the method is for electrostatically transporting a particle through said medium and through a second medium,
where said second plurality of phase-shifted voltage wave-forms are for the second media, and
where the phase-shifted voltage wave-forms of said second plurality of phase-shifted voltage wave-forms have a second amplitude and second frequency set according to the second media through which the particle is being transported.

8. The method of claim 4, where the method is for electrostatically transporting a particle through said medium and through a second medium, wherein the second medium is a liquid.

9. A system for electrostatically transporting a particle through a medium, comprising:
a substrate;
a first insulation layer formed on the substrate;
a plurality of electrodes arranged in a sequence on the insulation layer, where the electrodes are divided into a plurality of groups and the electrodes are arranged by group;
a second insulation layer over at least one of the electrodes; and
a phase shift circuit connected to the electrodes which supplies a voltage wave-form to each group of electrodes, where each voltage wave-form for each group is phase-shifted relative to the other phase-shifted wave-forms.

10. The system of claim 9, wherein the medium is a gas.

11. The system of claim 9, wherein the medium is air.

12. The system of claim 9, wherein each voltage wave-form has an amplitude of approximately 100V.

13. The system of claim 9, wherein the particle has a diameter less than approximately twenty micrometers.

14. The system of claim 9, wherein the particle has a diameter between approximately one and approximately ten micrometers.

15. The system of claim 9, wherein the particle is made of glass.

16. The system of claim 9, wherein the particle is an airborne pollen.

17. The system of claim 9, wherein the substrate is made from silicon.

18. The system of claim 9, wherein the substrate is made from glass.

19. The system of claim 9, wherein the first insulation layer is made from thermal oxide.

20. The system of claim 9, wherein the first insulation layer is approximately 1 micrometer thick.

21. The system of claim 9, wherein the electrodes are made from aluminum.

22. The system of claim 9, wherein the electrodes are arranged in a radial pattern.

23. The system of claim 9, wherein the electrodes are arranged in a linear pattern.

24. The system of claim 9, wherein the electrodes are arranged in a zig-zag pattern.

25. The system of claim 9, wherein the electrodes are each no more than approximately five micrometers wide.

26. The system of claim 9, wherein the electrodes are spaced approximately eight micrometers apart.

27. The system of claim 9, wherein the electrodes are spaced approximately five micrometers apart to accommodate a particle approximately five micrometers in diameter.

28. The system of claim 9, wherein the electrodes are spaced apart a distance approximately equal to the diameter of the particle.

29. The system of claim 9, wherein the second insulation layer is made from polytetrafluoroethylene.

30. The system of claim 9, wherein the second insulation layer is made from parylene.

31. The system of claim 9, wherein the second insulation layer is approximately one to approximately seven micrometers thick.

32. The system of claim 9, wherein the system is a micromachined airborne particle filter.

33. The system of claim 9, further comprising:
a second plurality of second electrodes arranged in a sequence on the insulation layer, where the second electrodes are divided into a plurality of second groups and the second electrodes are arranged by second group;
where the phase shift circuit supplies a second voltage wave-form to each second group of second electrodes, where each second voltage wave-form is phase-shifted relative to the other second phase-shifted wave-forms and which are different from said phase-shifted voltage wave-forms for said groups of electrodes.

34. The system of claim 33, where said plurality of electrodes and said second plurality of second electrodes are arranged perpendicular to one another.

35. The system of claim 33, where at least a portion of said electrodes of said plurality of electrodes and a portion of said second electrodes of said second plurality of second electrodes are interdigitated.

36. The system of claim 33, where the system is for electrostatically transporting a particle through said medium and through a second medium,
where said second phase-shifted voltage wave-forms are for the second media, and
where said second phase-shifted voltage wave-forms have a second amplitude and second frequency set according to the second media through which the particle is being transported.

37. The system of claim 33, where the system is for electrostatically transporting a particle through said medium and through a second medium, wherein the second medium is a liquid.

38. The system of claim 37, wherein the second medium is water.

39. The system of claim 37, further comprising a reservoir connected to the second insulation layer, positioned to contain the liquid between the reservoir and said second electrodes.

40. A method of manufacturing a system for electrostatically transporting a particle through a medium, comprising:

coating a substrate with an oxide layer;

depositing a first metal layer upon the oxide layer;

patterning the first metal layer to form electrodes;

depositing a first insulation layer upon the oxide layer and the electrodes;

patterning the first insulation layer to open a contact hole to at least one electrode;

depositing a second metal layer upon the first insulation layer, where the second metal layer contacts the first metal layer through the contact hole;

patterning the second metal layer; and depositing a second insulation layer upon the first insulation layer and the patterned second metal layer.

41. A method of manufacturing an airborne particle filter including a system for electrostatically transporting a particle across the filter, comprising:

depositing a first silicon nitride layer on a first side of a silicon wafer and a second silicon nitride layer on a second side of the silicon wafer;

etching the second side of the silicon wafer, using the second silicon nitride layer thereon as a mask;

patterning the first silicon nitride layer to open holes in the silicon nitride layer;

depositing a first metal layer upon the first silicon nitride layer;

patterning the first metal layer to form electrodes upon the first silicon nitride layer;

depositing an insulation layer upon the first silicon nitride layer and the electrodes;

patterning the insulation layer to open at least one contact hole to at least one electrode;

depositing a second metal layer upon the insulation layer, where the second metal layer contacts at least one electrode through at least one contact hole;

patterning the second metal layer; and etching the silicon wafer from the second side to remove the silicon contacting the first silicon nitride layer opposite the electrodes.

* * * * *